March 31, 1942.  A. LEPETIT  2,278,203
INTERMITTENT RECORDER FOR ANGLE MEASUREMENT
Filed March 20, 1939  3 Sheets-Sheet 1
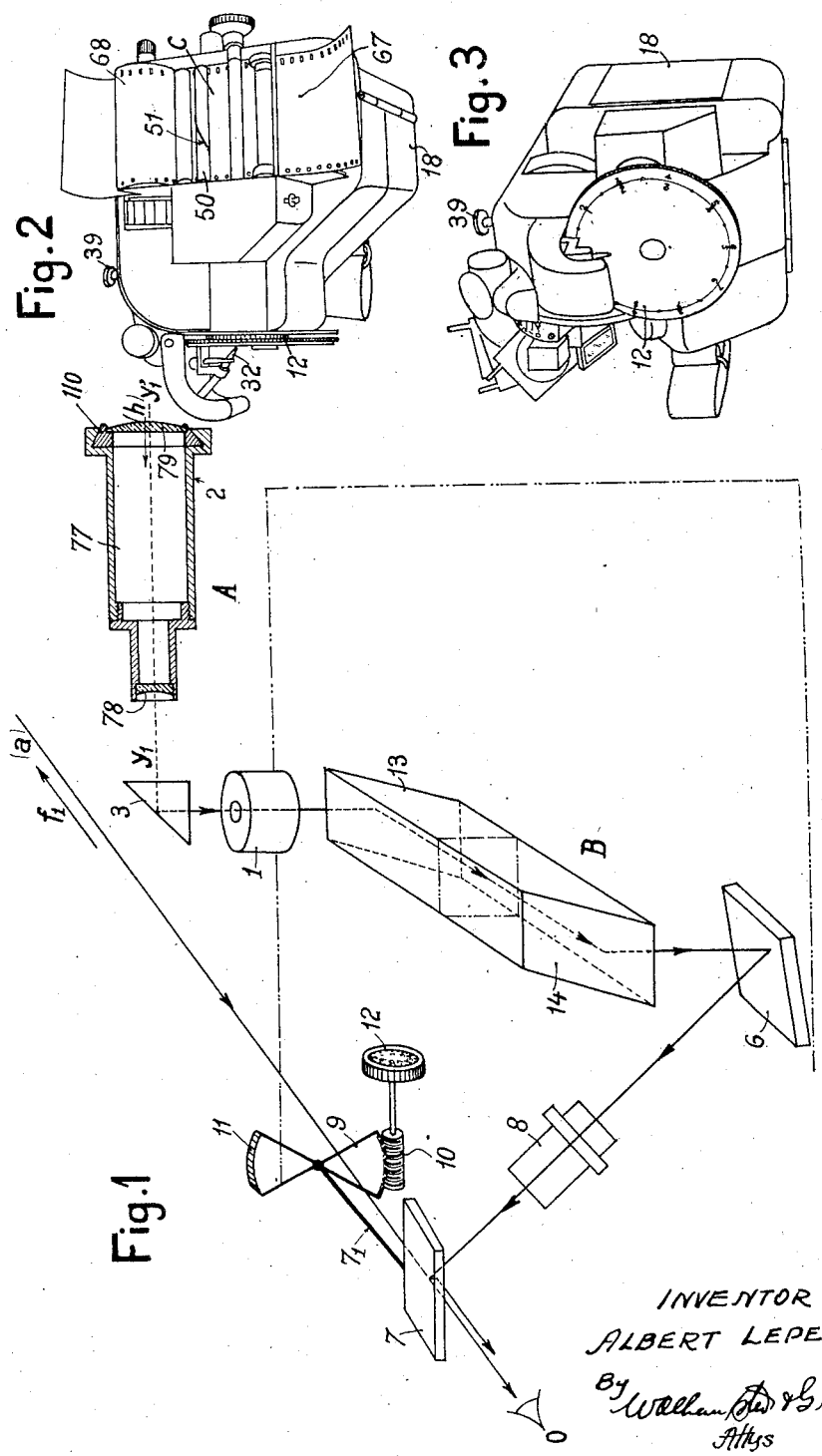
INVENTOR
ALBERT LEPETIT
By William ... & Groff
Attys

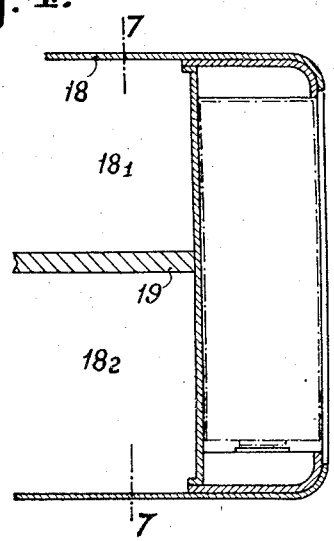
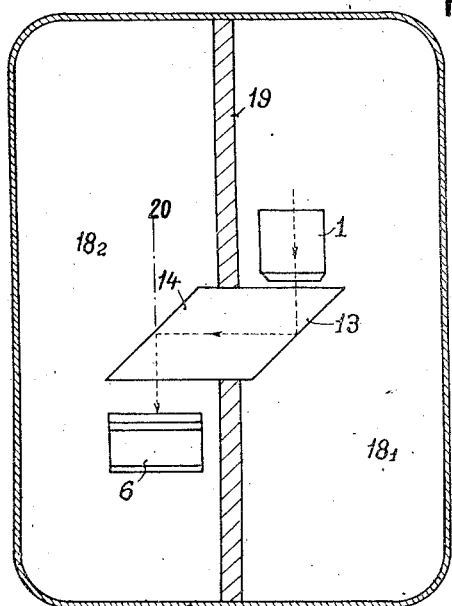
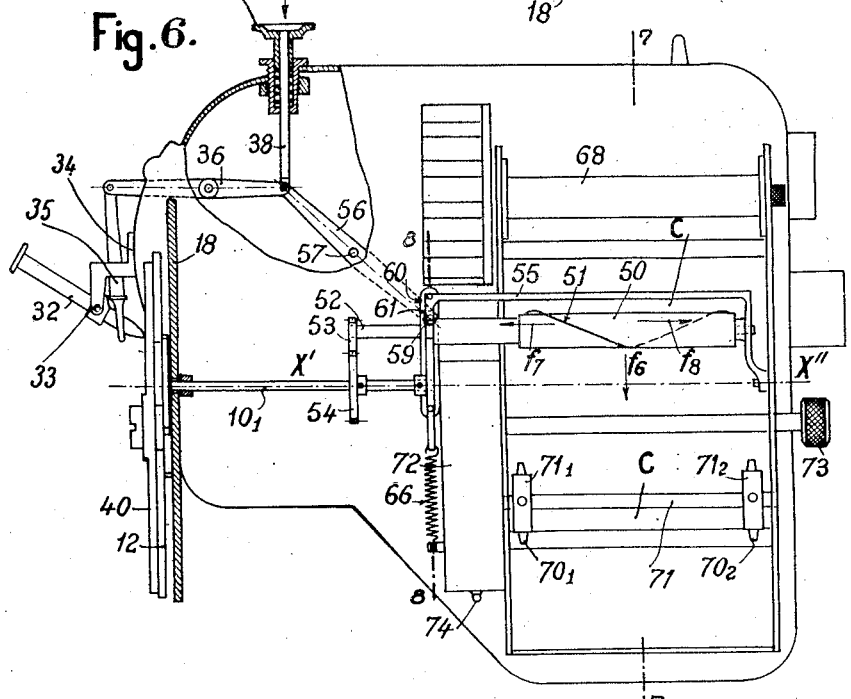

March 31, 1942. A. LEPETIT 2,278,203
INTERMITTENT RECORDER FOR ANGLE MEASUREMENT
Filed March 20, 1939 3 Sheets-Sheet 3
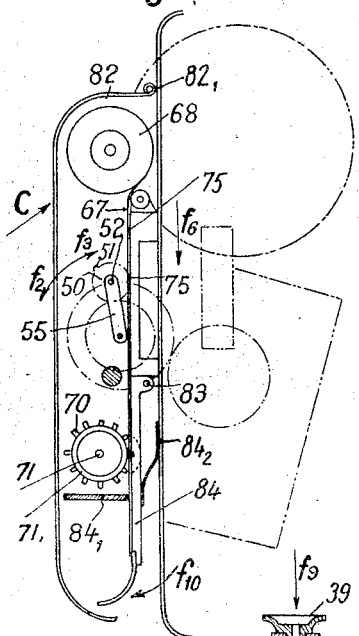
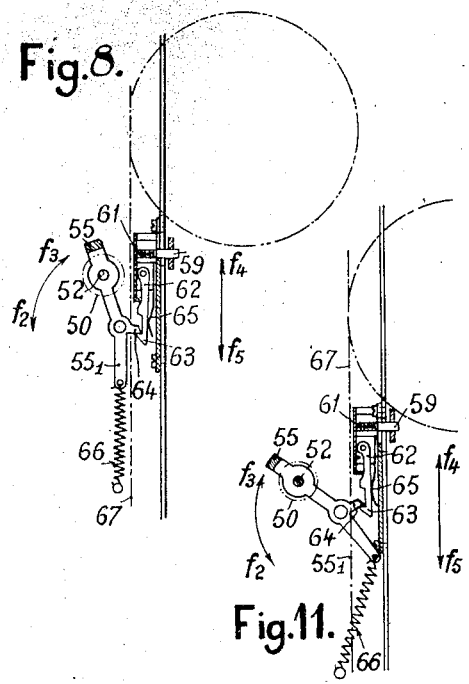
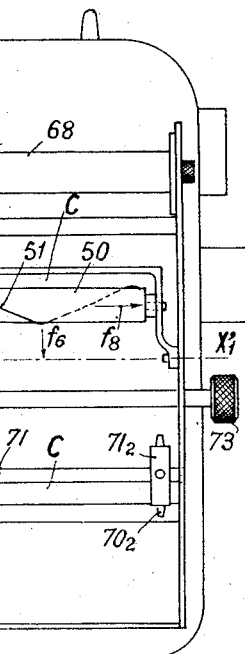
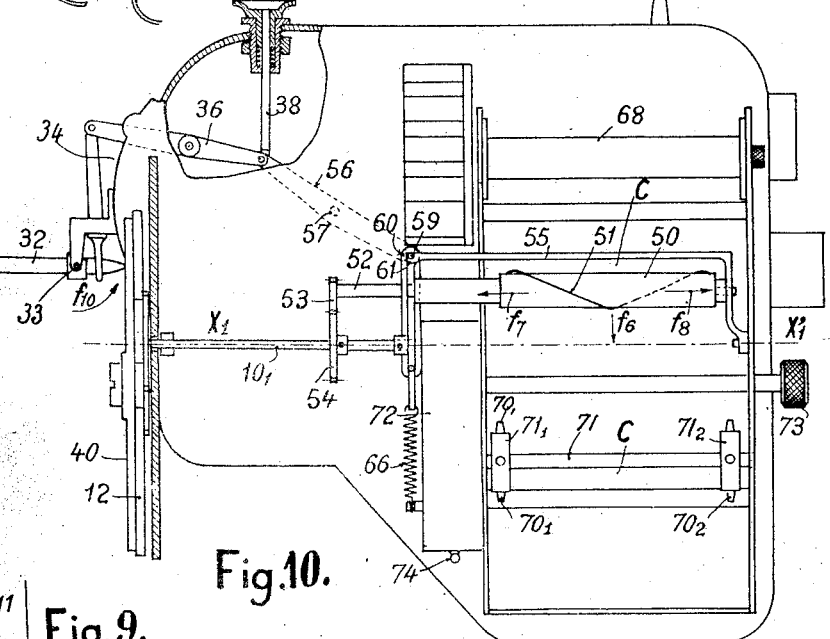
INVENTOR
ALBERT LEPETIT Patented Mar. 31, 1942

2,278,203

UNITED STATES PATENT OFFICE 2,278,203

INTERMITTENT RECORDER FOR ANGLE MEASUREMENT

Albert Lepetit, Montrouge, France

Application March 20, 1939, Serial No. 262,990
In France May 16, 1938

2 Claims. (Cl. 234—1)

The object of the present invention is to provide an optical apparatus for measuring angles for instance altitude such as is performed by a sextant, which permits the recording of the altitude of the star under observation as a function of the time at which said observation is taken. It also has for its object to trace the average line of altitude variation as a function of the time; it being possible to utilize said line for determining the altitudes corresponding to known times.

The present invention is an improvement, particularly as to the recording mechanism, over the instrument disclosed in my Patent No. 2,106,460, issued January 25, 1938.

My optical apparatus for measuring angles is performed by a sextant, in accordance with the invention and permitting attainment of the previous objects, presents the characteristics which will appear from the following description and especially from the appended claims.

My optical apparatus, in accordance with the invention, is shown, by way of example, on the accompanying drawings in which:

Fig. 1 shows schematically the optical paths whereby the assembled optical measuring units of my invention function, including both optical and recording units, Figs. 2 and 3 are two perspective views according to two faces of the apparatus, Fig. 4 is a partial transverse cross-section, Fig. 5 is a partial cross section, Fig. 6 is a side view, housing removed, showing the angle measuring device and the time drive for recording, Figs. 7, 8, 9 are partial transverse cross sections along the lines 7—7, 8—8, 9—9, respectively of Fig. 6, Figs. 10 and 11 are similar to Figs. 6 and 9 respectively, but shown another position of the elements, The optical apparatus shown on the enclosed drawings comprises two groups A and B of principal units.

The group A comprises the bubble level 1 and the device 3 for illuminating said level, The group B comprises two mirrors 6—7 and a lens 8 disposed between said two mirrors.

The mirror 6 is stationary, while the mirror 7 mounted on a rotatable spindle 7¹, is connected to an actuating mechanism with toothed sector 9 and worm 10.

A rotatable element 11 is graduated, for instance, in tens of degrees, and a dial or circle 12 is graduated in degrees and minutes and also serves as a knob, permitting the measurement of the rotation of mirror 7. An intermediate optical system, formed, for example, of two prisms 13—14 with total reflection, or of one single double reflection prism, permits passage of the luminous rays from the group A onto the group B.

To make the observations, the observer puts his eye at O and observes the star which lies in the direction of arrow $f^1$ for instance. At the same time, he sets the mirror 7 by means of the mechanism 9—10—12, so that the image of the level bubble, successively reflected by the prisms 13—14 and the mirrors 6—7 coincides with that of the star.

The observer repeats this observation several times for one given star; each time, he makes a mark on a paper or Celluloid sheet 40, fixed to the graduated circle 12 and he reads the graduation on the graduated rotating element 11.

Fig. 2 and the following figures show the way of performing the above operation, but the elements shown on the diagram of Fig. 1 are, in accordance with the invention, connected to a recording device C which records the stars' altitudes at the various observations as a function of the times at which said observations are taken.

The entire assembly of angle measuring and recording means is carried by a housing 18 having two main chambers separated by a wall 19 (Figs. 4 and 5 of my Patent 2,106,460, and Fig. 4 of this present application).

One chamber 18¹ holds the members of group A, viz. the bubble level 1, with its illuminating device, the prism 3 and the mirror driving mechanism.

Another chamber 18² contains the optical system of group B, viz. the prism 14, the mirror 6, the lens 8 and the rotatable mirror 7.

The auxiliary optical system formed by the prisms 13—14 or one double reflection prism, deviates the luminous beam to bring it in the optical plane 20 of observation (Fig. 5) of the second chamber 18²; the optical transmission from the first to the second chamber is thus insured.

The worm screw mechanism 10 and toothed sector 9 operating the orientation of the main mirror 7, coacts with a cylinder 50 (Figs. 2—6—7—8—9) which carries a projecting spiral 51 (Figs. 2—6—7—8—9).

Said cylinder 50, is mounted on a rotating shaft 52, connected through the gears 53—54 to the shaft 10¹ of the worm screw 10 actuating the mirror 7. The shaft 52 of the cylinder 50 is carried by a frame 55, movable around the axis X' X", which permits adjustable rotation of the whole of cylinder 50 and of its supporting frame 55 in the direction of arrows $f^2$ or $f^3$.

The swivelling motion of said cylinder 50 is operated through the button 39 of the needle or pencil 32 recording device, pivoted on a pin 33 carried by a spring blade 34, fixed to the housing 18. A fork 35, articulated on the end of a lever 36 is in contact with said pencil 32; the lever 36 swivel mounted around a pivot 37 fixed to the frame 18 is, in turn, articulated on the end of rod 38 carrying push button 39.

Furthermore, a lever 56, rotatable around a pivot 57 is articulated on the end of the rod 38 at the same point as the lever 36 (Fig. 6).

The opposite end of said lever 56 drives through trunnion 59 and guide 60 a fork 61 which thus slides in the direction of arrows $f^4$ or $f^5$ (Fig. 6—8).

Said fork 61 carries a swivelling lever 62 having a hook 63 which cooperates with a latch 64 fixed to the frame 55 (Fig. 8). A spring 65 insures the contact between said latch 64 and the hook 63. A recoil spring 66, acting on a prolongation $55^1$ of the frame 55 constantly tends to bring said frame 55 to the position of Fig. 8 i. e. the mid-position.

An escapement mechanism is thus constituted.

A recording ribbon or tape 67, preferably made of colored and superficially paraffined paper, is rolled up around a loading reel 68. Said ribbon bears lateral indentations 69 into which the teeth $70^{1-2}$ of the two cog-ends $71^{1-2}$, of take-off reel 71, engage; this permits the displacement of the ribbon 67 in the direction of arrow $f^6$. Said displacement is carried out under the action of a clock mechanism, which is schematically shown at 72 and which rotates the shaft of the take-off reel.

This clock mechanism comprises a winding up knob 73 and a stop button 74.

The ribbon or tape 67 passes between the cylinder 50 having a spiral 51 and a plate 75. The clock mechanism is intended for rolling up the ribbon 67 by a constant length per unit of time, for example 15 millimeters per minute.

The ribbon 67 is ruled in rectangles in length and width. In length it is ruled in minutes of time; in width it is ruled in degrees of sidereal arc.

The angular position of the cylinder 50 is determined as a function of the angle by which the worm screw 10 has rotated (i. e. the dial 12) to bring the mirror 7 to a position insuring the coincidence between the image of the star and the image of the level bubble 1.

The point of tangency 76 between the spiral 51 of the cylinder 50 and the ribbon or tape is thus displaced axially according to the direction of arrows $f^7$ or $f^8$ when the cylinder 50 is rotated in one direction or in the other as mirror 7 is alined.

When the spiral 51 strikes the ribbon or tape 67 a dash is marked, the position of which in the direction of arrows $f^7$ or $f^8$ is a function of the angle by which the mirror 7 has rotated.

Thus, an instrument 12 for measuring angular positions is obtained which is connected, on one hand, to a recording device constituted by the cylinder 50 with spiral 51 and, on the other hand, a marker constituted by the paper carried on dial 12, the needle 32 and its operating push-button 39.

It is advantageous to mount the recording device in such a way that it can be adjusted to permit setting at will, the starting point for the record of altitudes with respect to the ribbon or tape 67, in order to take into account the movement of the star as a function of time. The whole range of recorded altitudes thus remains within the limits of the ribbon width.

Said adjustment is obtained by having the cylinder 50 carrying the spiral 51, friction mounted on its shaft 52. A mark III permits to bring the cylinder 50 in correct angular position with respect to shaft 52.

On the other hand, the ribbon or tape 67, as well as the reel 68, the wheels $71^{1-2}$ and the cylinder 50, are protected by a housing 82 jointed at $82^1$. Said housing may be opened to insert the ribbon 67.

A guide blade $84^1$ insures the correct feed of the ribbon or tape 67 after its passage over toothed cogs $71^{1-2}$ while a plate 84 is mounted and articulated at 83 so that it can be lowered to permit the disengagement of the ribbon with respect to the teeth of the wheels $71^{1-2}$. Thus, the introduction and the disengagement of the ribbon are made easy. In order to slip the ribbon, one presses on the plate 84. The ribbon escapes from the teeth $70^{1-2}$. In order to have said ribbon driven by the toothed wheels $71^1$—$71^2$, the plate 84 is released. The spring $84^2$ then pushes the plate 84 according to $f^{10}$, said plate 84 then pushing the ribbon 67 which engages through its indentations 69 in the teeth of the wheels $71^{1-2}$. The guide blade $84^1$ is used for cutting that part of the ribbon 67 on which the inscriptions have been made.

The above apparatus may be completed with an optical system, lighting the level 1 either by means of the sun light or through a lamp. However, in the way of performing the process as described, the apparatus is combined with an optical system 77 having lenses 78—79 with horizontal optical axis. This device which thus permits taking observations on the natural horizon, comprises a sliding system 110 for the setting of the coincidence of the natural horizon and of the level bubble when the dial 12 marks zero.

The operation is the following:

The observer puts in coincidence the image of the star $a$ and that of the horizon $h$ (Fig. 1) by making the mirror 7 rotate by means of the dial 12. The latter thus rotates by an angle as a function of the star height. There results a rotation of cylinder 50 and a displacement of the tangency point 76 between the spiral and the ribbon 67 which are also a function of said star height.

During this operation, the spiral 51 has remained out of contact with the ribbon 67 (Fig. 8).

The observer then presses on the button 39 in the direction of arrow $f^9$ (Figs. 6-10), so that the pencil 32 swings in direction of arrow $f^{10}$ and traces a line on the paper 40 carried by the dial 12; during said swing of the pencil 32, the spring blade 34 bends so that the pressure of the pencil on the paper 40 remains constant.

Simultaneously, the lever 56 rotates and displaces the fork 61 in direction of arrow $f^4$ (Fig. 11).

The hook 63 of the lever 62 then causes rotation, in the direction of arrow $f^2$ of the unit formed by the lock 64, the frame 55 and the cylinder 50 about axis 52.

Towards the end of the stroke of push button 39, the latch 64 escapes from the hook 63, so that the unit 64—55—50 comes rapidly backwards in direction of arrow f³ under the action of the recoil spring 66. However, said unit goes beyond its position of balance in such a way that the spiral 51 hits the ribbon 67. Said spiral 51 thus traces a dash on said ribbon 67 while the needle 32 traces a line on the paper 40 of the dial 12.

The observer repeats the measurements at various intervals of time, then he effects a special marking after setting the instrument at the height immediately below the last mark, and he takes note of the sidereal time of the instant.

The observer then stops the clock movement; then he can cut with the blade 84¹ the part of the ribbon 67 on which the dashes have been traced.

The observer, then, interprets the results by means of a suitable chart.

The invention extends to the above described devices whatever may be the optical means utilized; in particular, said optical means may be either disposed in the same chamber, or, on the contrary, placed in two chambers separated from each other by a wall, by way of example.

I claim:

1. In a recording device for an angle measuring instrument, a rotatable shaft mounted for precision rotative adjustment for measurement of an angle, a rotatable cylinder having a raised spiral circumferential ridge, pivotally mounted radial members carrying said cylinder at their circumferential extremities, means for driving said cylinder from said shaft, a recording tape, reel means for causing said tape to feed at a determined rate past said cylinder, and manually operable control means comprising recoil spring means actuatable for urging said radial members and said cylinder into marking position to engage said tape and record thereon the setting of said shaft.

2. A recording device according to claim 1, said control means further comprising lever and hook means, latch means engageable with said hook means and normally holding said cylinder out of marking position, and said latch means being mounted when released to cause said recoil spring means to urge said radial members and said cylinder into marking position.

ALBERT LEPETIT.